(12) United States Patent
Lawson et al.

(10) Patent No.: US 9,284,995 B2
(45) Date of Patent: Mar. 15, 2016

(54) ELECTROMAGNETIC AXLE DISCONNECT SYSTEM

(71) Applicant: Dana Automotive Systems Group, LLC, Maumee, OH (US)

(72) Inventors: Mitchell R. Lawson, Perrysburg, OH (US); Julius L. Jones, Toledo, OH (US); Rick C. Sigmon, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 60 days.

(21) Appl. No.: 14/150,064

(22) Filed: Jan. 8, 2014

(65) Prior Publication Data

US 2014/0190781 A1    Jul. 10, 2014

Related U.S. Application Data

(60) Provisional application No. 61/750,597, filed on Jan. 9, 2013, provisional application No. 61/750,683, filed on Jan. 9, 2013.

(51) Int. Cl.
*F16D 27/118*    (2006.01)
*F16D 11/00*    (2006.01)

(52) U.S. Cl.
CPC ........ *F16D 27/118* (2013.01); *F16D 2011/006* (2013.01); *Y10T 29/49826* (2015.01)

(58) Field of Classification Search
CPC ................................................ F16D 2011/006
USPC ....................................... 192/84.92; 475/150
See application file for complete search history.

(56) References Cited

U.S. PATENT DOCUMENTS

| 5,030,181 | A | * | 7/1991 | Keller ........................... 475/150 |
| 5,788,008 | A | | 8/1998 | Fort |
| 7,887,450 | B2 | * | 2/2011 | Fusegi .................... F16H 48/08 |
| | | | | 192/84.96 |
| 8,050,829 | B2 | | 11/2011 | Johnson |
| 2012/0234120 | A1 | * | 9/2012 | Fukuda et al. .................. 74/405 |

* cited by examiner

*Primary Examiner* — Richard Lorence
(74) *Attorney, Agent, or Firm* — Marshall & Melhorn, LLC

(57) ABSTRACT

An electromagnetic disconnect system has an output housing having an armature with a coil and an output shaft bearing fixed to it. A pressure plate and a sliding dog clutch are slidably attached to an output shaft that is in rotational contact with the output shaft bearing. This system further has an input housing attached to the output housing. The input housing has an input shaft bearing fixed to it. The electromagnetic disconnect system further has a disengagement spring and an axially fixed dog clutch rigidly attached to an end of an input shaft that is axially disposed through an opening in the input housing and in rotational contact with the input shaft bearing.

4 Claims, 5 Drawing Sheets

US 9,284,995 B2

ELECTROMAGNETIC AXLE DISCONNECT SYSTEM

RELATED APPLICATION

This application claims the benefit under 35 U.S.C. §119 (e) of U.S. Provisional Patent Application Ser. No. 61/750,597, filed Jan. 9, 2013 and U.S. Provisional Patent Application Ser. No. 61/750,683, filed Jan. 9, 2013, and which are incorporated by reference herein in their entirety.

FIELD OF THE INVENTION

The present invention relates to connecting, locking, and disconnecting axles within a vehicle. More particularly, the present invention relates to electromagnetically connecting, mechanically securing, and disconnecting axles within a vehicle.

BACKGROUND OF THE INVENTION

In order to switch a vehicle between two-wheel and all-wheel drive, typically, an electromechanical actuator means is used (see, for example, U.S. Pat. No. 5,788,008 to Fort). In order to secure such a vehicle in either a two or all-drive position, often, an electronically controlled axle locking mechanism is applied to an electromechanical actuator means.

However, automotive manufacturers have new requirements for an axle disconnect system, which must disconnect the torque path from wheels to a ring gear, on request, during normal driving. In addition, noise, vibration, and harshness requirements are becoming more stringent, while response time of no more than 200 milliseconds from a time of receiving a command signal is required. Further, drag torque should be minimized across the vehicle operating speed range.

Unfortunately, conventional connecting, locking, and disconnecting axles systems, which are based on electromechanical actuators, are not capable of achieving these new requirements. In addition, the more stringent noise, vibration, and harshness requirements, and response time of no more than 200 milliseconds from a time of receiving a command signal cannot be met by conventional systems.

Consequently, what is sought is a means to achieve these new requirements without increasing the material and labor costs involved. These means need to also improve the reliability and efficiency of vehicle operations.

SUMMARY OF THE INVENTION

An electromagnetic disconnect system comprises an output housing having an armature with a coil and an output shaft bearing fixedly attached thereto. An output shaft has splines disposed on an end thereof, where a pressure plate and a sliding dog clutch are slidably attached to the output shaft, where the output shaft is axially disposed through an opening in the output housing and in rotational contact with the output shaft bearing. The electromagnetic disconnect system further comprises an input housing fixedly attached to the output housing. The input housing having an input shaft bearing fixedly attached thereto. The electromagnetic disconnect system further comprises a disengagement spring and an axially fixed dog clutch rigidly attached to an end of an input shaft that is axially disposed disposed through an opening in the input housing and in rotational contact with the input shaft bearing.

When the coil is energized, the armature with coil slidably moves the pressure plate and sliding dog clutch into engagement with the axially fixed dog clutch, thereby allowing rotational torque from the input shaft to be transferred to the output shaft.

When transferring torque from the input to output shaft, the cams on the output shaft provide a self-locking force which allows the force applied to the movable clutch member to be reduced or eliminated.

When the coil is de-energized, the disengagement spring disengages the pressure plate, sliding dog clutch, and armature from the axially fixed dog clutch, thereby disengaging rotational torque from the input shaft to be transferred to the output shaft.

Further objects and advantages of the present invention will be apparent from the following description and appended claims, reference being made to the accompanying drawings forming a part of a specification, wherein like reference characters designate corresponding parts of several views.

DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
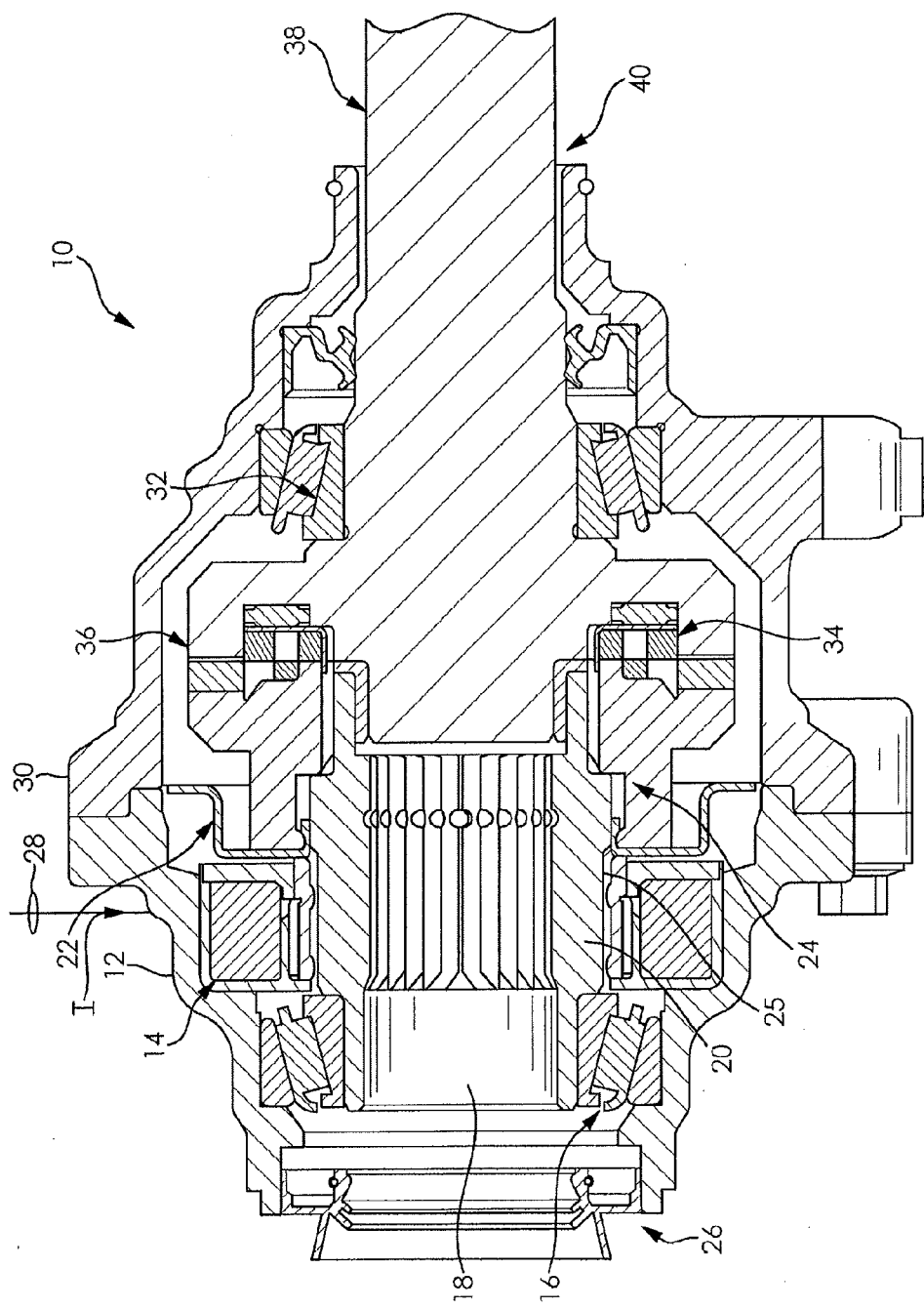
FIG. 1 is a cross sectional view of an electromagnetic disconnect system in accordance with the present invention.

FIG. 1 illustrates an electromagnetic disconnect system 10 in a mechanically disengaged position that comprises an output housing 12 having an armature 48 with a coil 14 and an output shaft bearing 16, where the coil 14 and the output shaft bearing 16 are fixedly attached thereto. An output shaft 18 has splines 20 disposed on end thereof, where a pressure plate 22 and a sliding dog clutch 24 are slidably attach to output shaft cams 25 of the output shaft 18 and the output shaft 18 is axially disposed through an opening 26 in the output housing 12, and in rotational contact with the output shaft bearing 16. The electromagnetic disconnect system 10 further comprises an input housing 30 fixedly attached to the output housing 12. The input housing 30 having an input shaft bearing 32 fixedly attached thereto. The electromagnetic disconnect system 10 further comprises a disengagement spring 34 and an axially fixed dog clutch 36, both of which are rigidly attached to an input shaft 38 that is axially disposed through an opening 40 in the input housing 30 and in rotational contact with the input shaft bearing 32.

When the armature 48 with the coil 14 is energized by way of current I in wiring 28, the pressure plate 22 and sliding dog clutch 24 are slidably moved into mechanical engagement with the axially fixed dog clutch 36, thereby allowing rotational torque from the input shaft 38 to be transferred to the output shaft 18.

When the sliding dog clutch and fixed clutch are engaged, torque is transferred thru the cams on the sliding dog clutch to the cams on the output shaft. This transfer of torque produces an axial force securing the sliding clutch member in place.

When the armature 48 with the coil 14 is de-energized, the disengagement spring 34 disengages the pressure plate 22 and sliding dog clutch 24 from the axially fixed dog clutch 36, thereby not allowing rotational torque from the input shaft 38 to be transferred to the output shaft 18.

Figure 2:
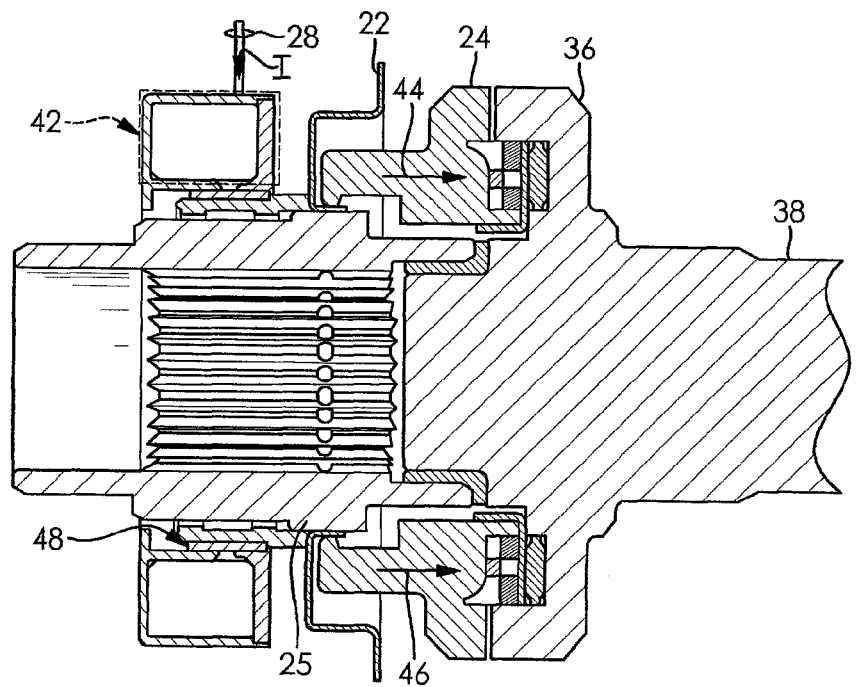
FIG. 2 is a partial cross sectional view of the electromagnetic disconnect system of FIG. 1 at the start of engagement.

FIG. 2 illustrates the flux path 42 around the armature 48 with coil 14, when the electrical current I is conducted through the wiring 28 into the armature 48 with the coil 14, at the start of engagement. Hence, the armature 48 with the coil 14 moves the pressure plate 22 and sliding dog clutch 24 toward the axially fixed dog clutch 36, as shown by the arrows 44, 46.

Figure 3:
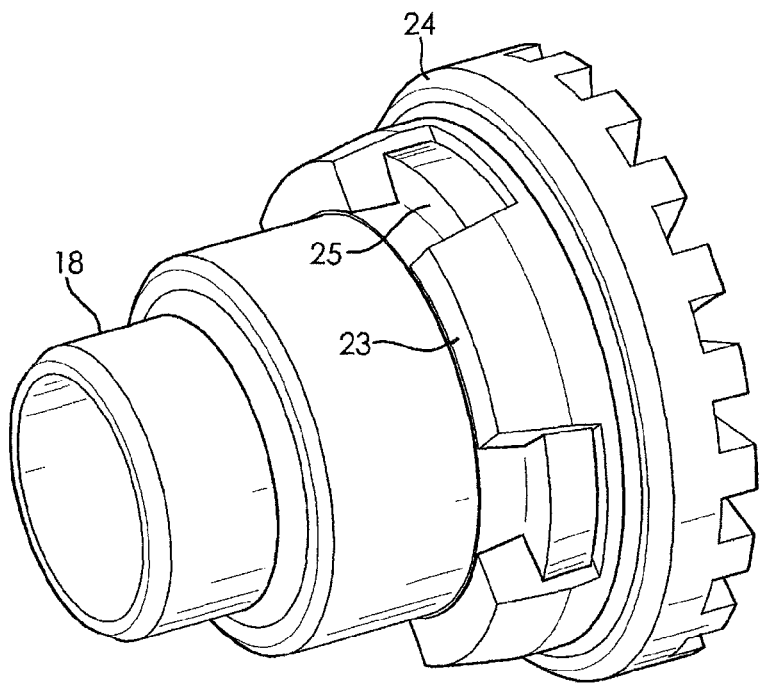
FIG. 3 is a perspective view of a dog clutch of the electromagnetic disconnect system of FIG. 1 in a disengaged position.
Figure 4:
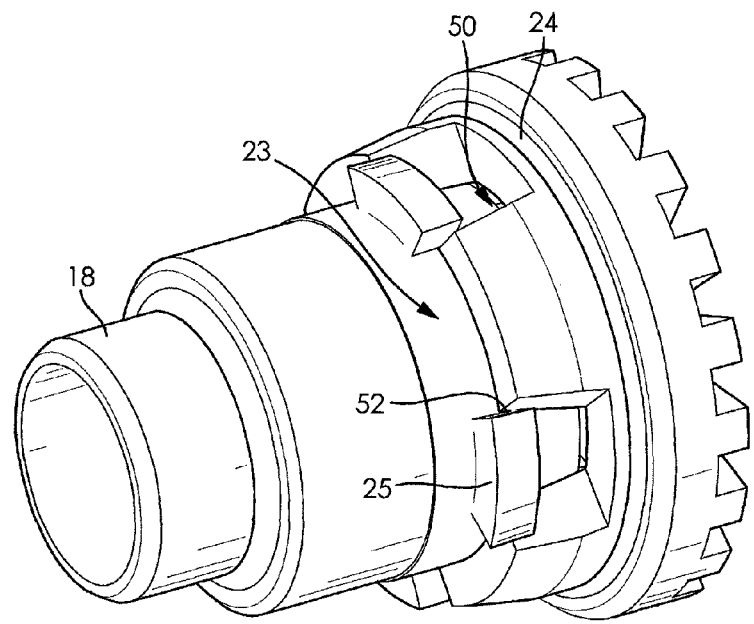
FIG. 4 is a perspective view of the dog clutch of FIG. 3 in an engaged position.

FIG. 3 illustrates the sliding dog clutch 24 in the disengaged position, where output shaft cams 25 are seated in the sliding dog clutch cams 23. FIG. 4 illustrates the sliding dog clutch 24 in the engaged position, where angled 50 portion of the sliding dog clutch cams 23 have slid away from the angled 52 portion of the output shaft cams 25 so as that the sliding dog clutch 24 can contact the axially fixed dog clutch 36, in order to transfer torque from the input shaft 38 to the output shaft 18 and provide self-locking action.

Figure 5:
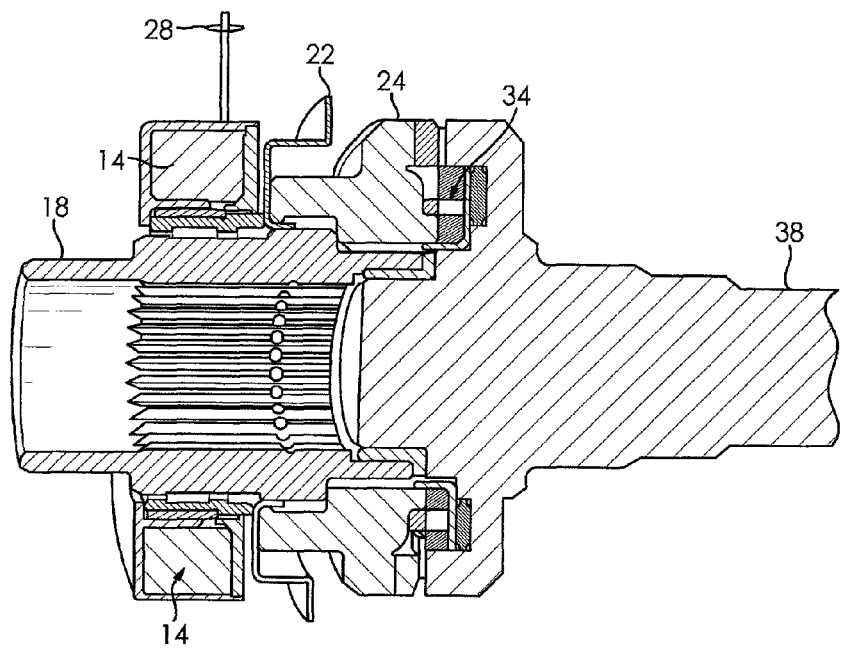
FIG. 5 is a partial cross sectional view of the electromagnetic disconnect system of FIG. 1 in disengagement.
Figure 6:
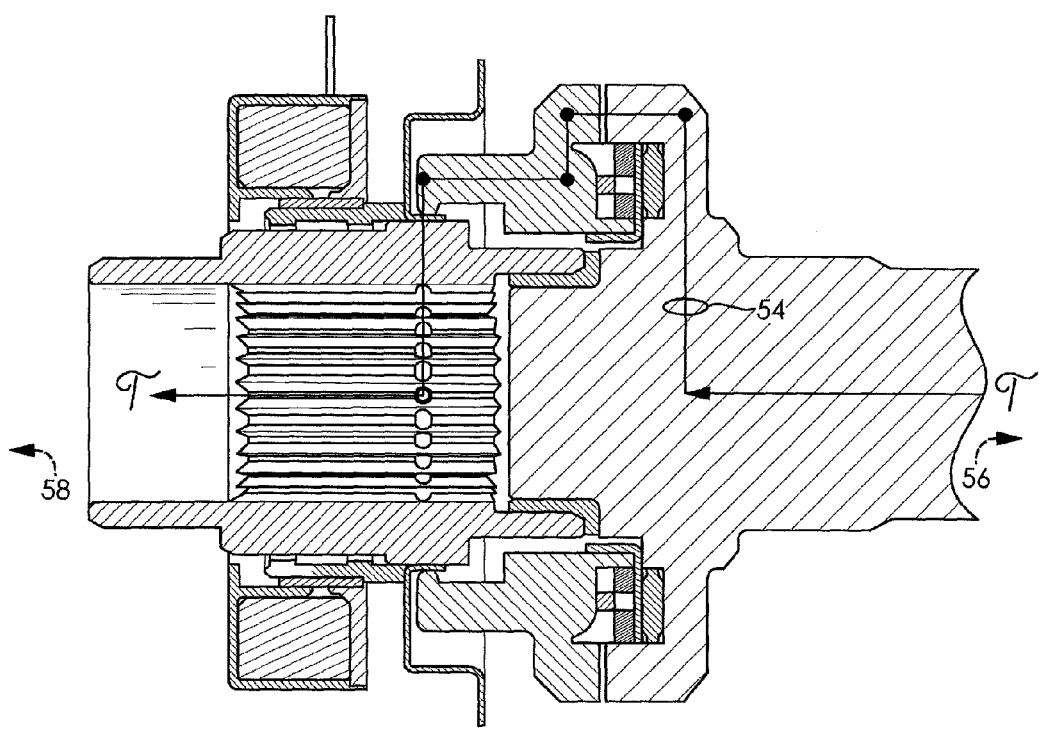
FIG. 6 is a partial cross sectional view of the electromagnetic disconnect system of FIG. 1 showing torque flow.

FIG. 5 illustrates the electromagnetic disconnect system 10 in disengagement where the de-energized armature 48 with the coil 14, in cooperation the disengagement spring 34, causes the pressure plate 22 and sliding dog clutch to disengage the axially fixed dog clutch 36. FIG. 6 illustrates a flow diagram of a torque path 54, where the torque T from a vehicle side gear 56 (not shown but common in the art) is transferred to a vehicle axle shaft 58, 56 (not shown but common in the art).

The present invention electromagnetic disconnect system 10 is capable of achieving new requirements imposed on vehicle axle systems by automotive manufacturers. These requirement involve more stringent noise, vibration, and harshness requirements, response time of no more than 200 milliseconds from a time of receiving a command signal, which conventional electromechanical systems cannot meet. It has been found that the electromagnetic disconnect system 10 achieves these new requirements without increasing the material and labor costs involved. Further, the electromagnetic disconnect system 10 improves the reliability of vehicle operations.

Figure 7:
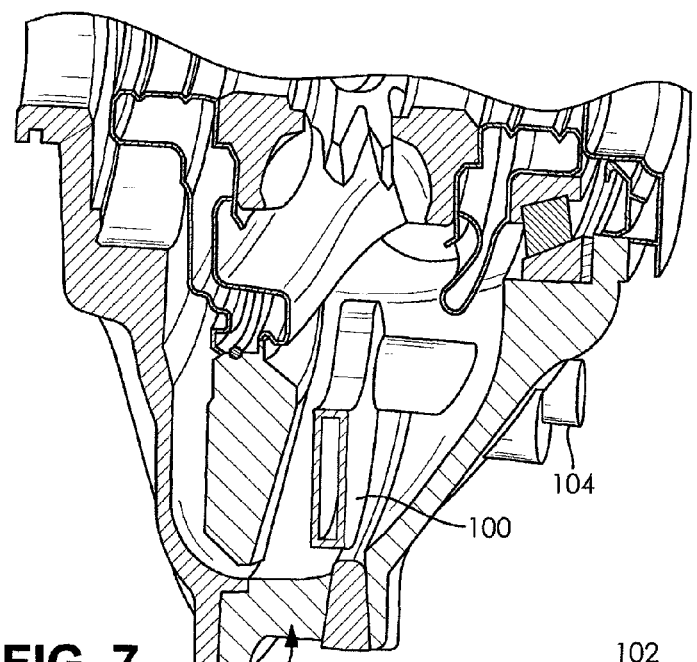
FIG. 7 is a cross sectional view of a differential case having a heat exchanger in accordance with the present invention.
Figure 8:
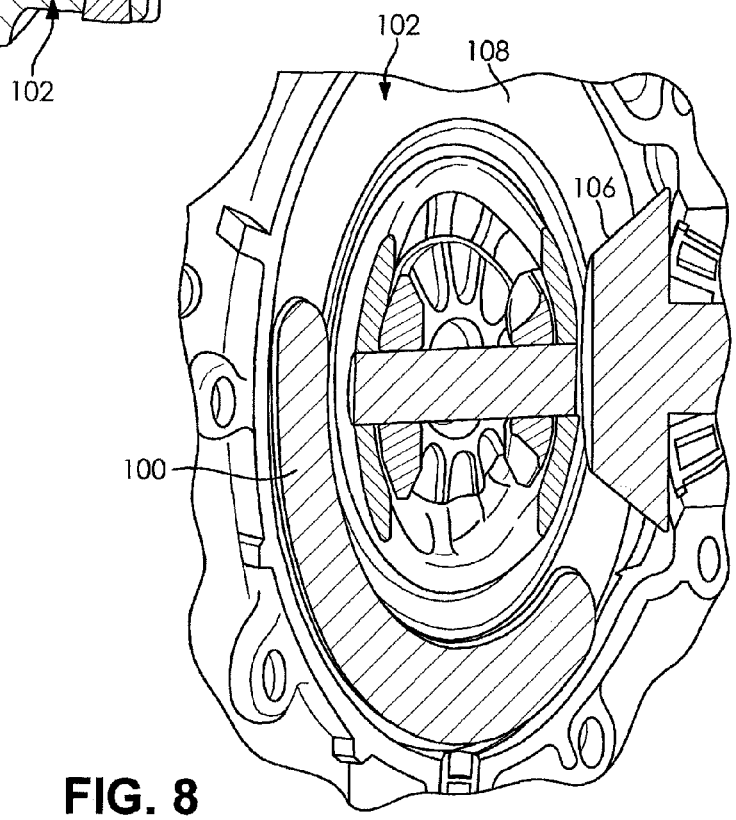
FIG. 8 is a cross sectional view through the heat exchanger of FIG. 7.

In addition, FIGS. 7 and 8 illustrate a heat exchanger 100, which may be banana shaped, that is embedded in oil that is contained in a differential case 102. Cooling fluid flows into and out of the heat exchanger 100 by way of tubing 104, thereby cooling the oil with in the differential case 102.

FIG. 8 shows a pinion gear 106 that would be in meshing contact with a ring gear 108. As the cooling fluid flows in and out of the heat exchanger 100, heat is transferred from the hot oil to the cooling fluid, which conducts the heat outside of the differential case 102. Thereby, allowing various gears within the differential case 102 to operate properly and assure long term reliability for the differential 102.

The heat exchanger structure 100 can be applied to the axle output housing 12 of the above-described electromagnetic disconnect system 10 of FIG. 1.

The following physical characteristics of Tables 1 and 2, associated with the heat exchanger structure 100, make it novel over other heat exchanger structures.

TABLE 1

| Calculation at hot temperatures: | |
| --- | --- |
| Coolant type: | 50/50 |
| Coolant temperature: | 145° C. |
| Coolant flow rate: | 7 l/min |
| Oil type: | ATF Dexron 3 |
| Oil flow rate | 20 l/min flowing inside the HX with a homogeneous distribution in across flow direction (i.e., perpendicular to the coolant flow) |
| Calculated heat transfer | 648.3 W |

TABLE 2

| Axle Oil Heat Exchanger size: | |
| --- | --- |
| Arc length: | 153 mm from fitting to fitting |
| Height: | 15 mm |
| Width: | 22 mm |
| Calculation at cold start: | |
| Coolant type: | 50/50 |
| Coolant temperature: | 60° C. |
| Coolant flow rate: | 7 l/min |
| Oil type: | ATF Dexron 3 |
| Oil flow rate | 20 l/min flowing inside the HX with a homogeneous distribution in across flow direction (i.e., perpendicular to the coolant flow) |
| Calculated heat transfer | 259.6 W |

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle axle electromagnetic disconnect system, comprising:
    an output housing having an armature with a coil and an output shaft bearing, the coil and the output shaft bearing fixedly attached to the output housing;
    an output shaft having splines and angled cams disposed on an end thereof;
    a pressure plate in contact with the armature;
    a sliding dog clutch having angled cams, slidably attached to the output shaft angled cams, and the output shaft axially disposed through an opening in the output housing and in rotational contact with the output shaft bearing;
    an input housing fixedly attached to the output housing, the input housing having an input shaft bearing fixedly attached thereto;
    a disengagement spring; and
    an axially fixed dog clutch rigidly attached to an end of an input shaft that is axially disposed through an opening in the input housing and in rotational contact with the input shaft bearing;

wherein, the coil is energized with rotational torque from the input shaft to the output shaft present, the output shaft cams are unseated within the sliding dog angled cams by the armature and the pressure plate, thus the sliding dog clutch is in slidable mechanical engagement with the axially fixed dog clutch and the output shaft cams self-lock a transfer of the input shaft rotational torque to the output shaft; and wherein, the coil is de-energized to seat the sliding dog angled cams within the output shaft angled cams, to disengage the armature and the pressure plate by way of the disengagement spring, and no longer transfer rotational torque from the input shaft to the output shaft.

2. The vehicle axle electromagnetic disconnect system of claim 1, wherein the vehicle axle electromagnetic disconnect system has a response time of no more than 200 milliseconds along a torque path from wheels to a ring gear, during normal driving conditions, from a received start command signal, so as to switch a vehicle between two-wheel and all-wheel drive.

3. A method of forming operating a vehicle axle electromagnetic disconnect system, comprising:
providing a coil and an output shaft bearing fixedly attached to an output housing;
providing a pressure plate, in contact with an armature, slidably attached to an output shaft having splines disposed on an end thereof;
providing a sliding dog clutch, with angled cams, slidably attached to the output shaft, wherein the output shaft has angled cams slidably attached to the sliding dog clutch angled cams;
axially disposing the output shaft through an opening in the output housing, wherein the output shaft is in rotational contact with the output shaft bearing;
providing an input housing fixedly attached to the output housing;
providing an input shaft bearing fixedly attached to the input housing;
providing a disengagement spring and an axially fixed dog clutch rigidly attached to an end of an input shaft that is axially disposed through an opening in the input housing and that is in rotational contact with the input shaft bearing;
energizing the coil, with rotational torque from the input shaft to the output shaft being present, thereby moving the armature and the pressure plate and unseating the output shaft cams within the sliding dog angled cams, placing the sliding dog clutch in slidable mechanical engagement with the axially fixed dog clutch and self-locking transferring rotational torque from the input shaft to the output shaft by the output shaft cams; and
de-energizing the coil, for seating the sliding dog angled cams within the output shaft angled cams, disengaging the armature and the pressure plate by way of the disengagement spring, and no longer transferring rotational torque from the input shaft to the output shaft.

4. The method of operating the vehicle axle electromagnetic disconnect system of claim 3, further comprising transferring a torque path from wheels to a ring gear during normal driving conditions, in no more than 200 milliseconds, from a received start command signal, thereby switching a vehicle between two-wheel and all-wheel drive.

* * * * *